United States Patent Office 3,434,903
Patented Mar. 25, 1969

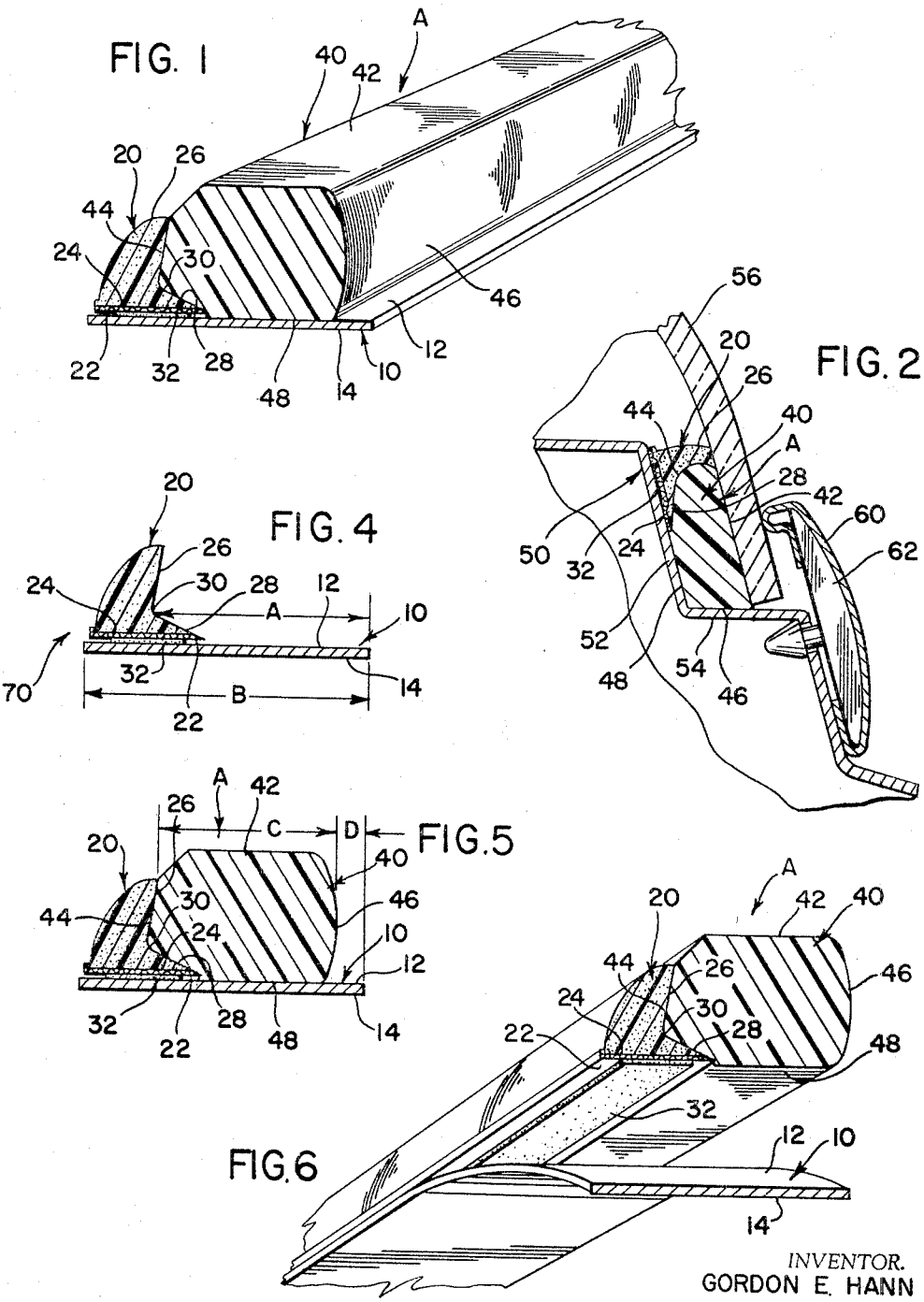

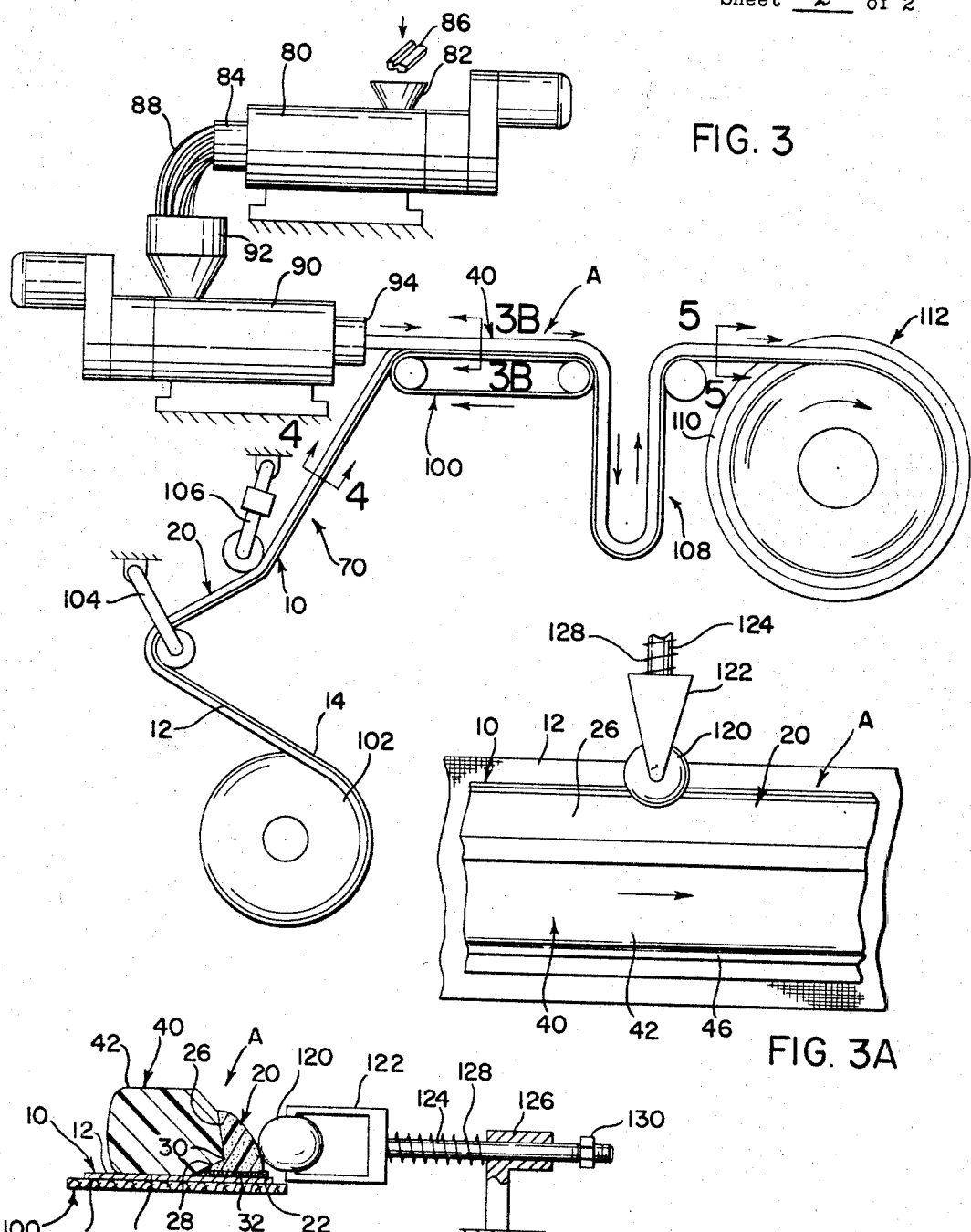

3,434,903
METHOD OF PRODUCING A PRESSURE SENSITIVE SEALING STRIP
Gordon E. Hann, Novelty, Ohio, assignor to The Tremco Manufacturing Company, Cleveland, Ohio, a corporation of Ohio
Filed Feb. 7, 1966, Ser. No. 525,674
Int. Cl. B32b 23/06, 7/06; B29f 3/00
U.S. Cl. 156—244                  8 Claims This invention pertains to the art of sealing strips and more particularly to a method of producing a pressure sensitive sealing strip.

The invention is particularly applicable for producing a pressure sensitive, cushion sealing strip to be used between two relatively stationary, spaced components on a motor vehicle, such as the window frame and the windshield, and it will be discussed with particular reference thereto; however, it will be appreciated that the invention has much broader applications and may be used for producing pressure sensitive sealing strips to be positioned between various other stationary, spaced elements.

In the assembly of motor vehicles, the windshields, and other similar components, must be mounted within preshaped frames by a means which prevents leakage around the windshield and excessive noise. This is now being accomplished by a pressure sensitive, adhesive sealing strip including both a resilient spacing dam with at least one layer of a pressure sensitive adhesive and a mass of tacky, pressure sensitive, pliable cushion material. The dam extends between the windshield and its frame to maintain a preselected spacing getween these components, and the tacky, pliable cushion material tenaciously adheres to the mutually facing surfaces of these components to form a water-tight seal therebetween. Because the tacky, pliable material has an extremely high adresive power that causes its adherence to most materials upon only slight contact, it has become common practice in the industry to deposit the resilient dam and the tacky mass, as a composite strip, on one side of a release paper strip. By special treatment, the release paper forms only a slight bond with both the tacky mass and the adhesive layer on the dam. In this manner, the adhesive layer on the dam is protected, and the tacky mass is generally prevented from inadvertent adherence with various packing and handling items. At the time of assembly, the release paper is progressively removed from the composite strip, and the strip is positioned around the opening within the windshield frame. Thereafter, the windshield is forced into the frame where it is held by the tenacious adhesive properties of the tacky sealing mass.

This type of pressure sensitive, cushion sealing strip is used in great quantities by the automotive industry; therefore, there is a substantial demand for producing the strip in an economical manner and, more particularly, in a manner which reduces the processing step required in its production.

The present invention is directed toward a method of producing the above-described pressure sensitive, cushion sealing strip, which method substantially reduces the processing steps and, thus, the cost of the strip.

In accordance with the present invention, there is provided a method of producing a support ribbon for a pressure sensitive, adhesive cushion seal. This method comprises the steps of providing a length of release paper having an upper surface and a lower surface, these surfaces being adapted to adhere releasably with a pressure sensitive adhesive; forming an elongated, resilient dam having a bottom, generally flat surface, an upstanding sealing lip, and a transversely extending anchor lip; applying a layer of transferable pressure sensitive adhesive onto the upper surface of the release paper and along one side thereof; and, bringing the bottom surface of the dam against the transferable adhesive so that the dam is secured longitudinally of the paper and at one side thereof with the sealing lip and anchor lip forming a retaining abutment for subsequent extrusions of a tacky, pressure sensitive, pliant cushion seal centrally located along the upper surface of the release paper.

By first producing as a unit a support ribbon including the resilient dam on one side of the release paper strip, the tacky, pliable, pressure sensitive cushion material may be extruded directly onto the center of the support ribbon. This overcomes the necessity for simultaneously depositing both the dam and the tacky, pliable material onto the release paper which procedure would involve complicated extruding and positioning apparatus. The method contemplated by the present invention also eliminates the necessity for repositioning the resilient dam on the release paper before extrusion of the tacky material onto the paper. All of these advantages, and others, result in a highly economical method of producing the pressure sensitive sealing strip of the type described above.

The primary object of the present invention is the provision of a method of producing a cushion sealing strip having a resilient dam and a tacky pressure sensitive sealing mass, which method is economical and includes a lesser number of processing steps than prior known methods.

Another object of the present invention is the provision of a method of producing a cushion sealing strip having a resilient dam and a tacky pressure sensitive sealing mass, which method includes, as an initial step, the provision of a support ribbon including a release paper strip with the dam releasably secured on one edge thereof.

These and other objects and advantages will become apparent from the following description used to illustrate the preferred embodiment of the present inevntion as read in connection with the accompanying drawings in which:

FIGURE 1 is a pictorial view illustrating the end product to which the present invention is directed;

FIGURE 2 is a partial cross-sectioned view illustrating the use of the product shown in FIGURE 1;

FIGURE 3 is a side plan view illustrating somewhat schematically, an apparatus for performing the method contemplated by the present invention;

FIGURES 3A and 3B are enlarged partial plan views illustratnig, somewhat schematically, an apparatus for performing another aspect of the present invention;

FIGURE 4 is an enlarged cross-sectional view taken generally along line 4—4 of FIGURE 3;

FIGURE 5 is an enlarged, cross-sectional view taken generally along line 5—5 of FIGURE 3; and FIGURE 6 is a pictorial view illustrating the product shown in FIGURE 1 as it is being prepared for assembly as shown in FIGURE 2.

Referring now to the drawings wherein the showings are for the purpose of illustrating a preferred embodiment of the invention only and not for the purpose of limiting same, FIGURES 1, 2 and 6 illustrate a composite pressure sensitive, cushion sealing strip A including a strip of protective release paper 10. The paper is treated, in a manner well known in the art, so that the adhesive components of the sealing strip are held on the paper with only a slight adhesion. This allows easy removal of the protective paper strip from the other components of the strip by a slight pulling force directed away from the strip. As illustrated, release paper 10 includes an upper surface 12 and a lower surface 14 with the upper surface supporting a foamed, resilient dam 20. This dam may be molded or extruded from rubber or synthetic plastic materials to provide a generally flat bottom surface 22 having an embedded reinforcing fabric 24, an upwardly extending sealing lip 26, a transversely extending anchor lip 28, and an apex 30 extending longitudinally of the dam at the intersection between the aforementioned lips. The two lips 26, 28 combine to form an abutment for a purpose hereinafter described in detail. On bottom surface 22 there is provided a transferable adhesive layer 32. In accordance with the invention, the adhesive layer is first deposited onto the upper surface of the paper 10, and then the dam is pressed onto the adhesive layer. This releasably supports the dam on the paper. When the paper is subsequently removed from the dam, the adhesive layer 32 is transferred from the paper to the dam for use in the sealing function. Of course, it is possible to secure the adhesive layer 32 onto the bottom surface of dam 20; however, this presents some processing difficulties because a strip of paper is fed through an adhesive applying apparatus more easily than the dam.

A tacky, pressure sensitive cushion mass 40 is located on the upper surface 12 of paper 10 so that it nests against the abutment formed by sealing lip 26 and anchor lip 28. These lips form a guide for depositing the mass 40 onto the release paper. This feature will be described later. The tacky mass includes a top 42, sides 44, 46, and a bottom 48, and it is formed from a tacky, pliable pressure sensitive material, which tenaciously adheres to a wide variety of materials, such as glass and metal. In addition, the mass 40 flows into various shapes dictated by the force applied onto the mass, in a manner similar to the flow of a putty. In other words, the mass itself does not provide an accurate spacing member. For this reason, the resilient dam 20 is used, in conjunction with the mass 40, for the purpose of providing a vertical spacing element for the sealing strip A. The particular material forming the mass 40 may be selected from various compounds well known in the art of pressure sensitive sealing strips.

Referring now to FIGURE 2, there is illustrated an environment in which the sealing strip A is particularly useful. A frame 50 includes intersecting walls 52, 54 which combine to define a windshield opening in a motor vehicle. A windshield 56 is adapted to be received within the opening so that the edge of the windshield generally matches the walls 52, 54. Sealing strip A is transported with the release paper 10 on the bottom surface. In this manner, the paper prevents the adhesive layer 32 and the bottom 48 of mass 40 from inadvertently adhering to packaging or handling items. Since strip A is provided in relatively long lengths, it is generally coiled onto an appropriate spool; and the paper 10 separates adjacent convolutions and thus prevents their adherence.

When the spool of sealing material is ready for use, the release paper strip 10 is pulled from the strip A, in a manner shown in FIGURE 6. The strip is then placed within frame 50 with the adhesive layer 32 and bottom 48 fitting against wall 52 and side 46 resting upon wall 54. Thereafter, the windshield 56 is pressed against the sealing strip A. The inward movement of the windshield is limited by the upstanding sealing lip 26 of the dam 20. The tacky, pliable mass 40 flows into the general shape shown in FIGURE 2, and the top 42 tenaciously adheres to and seals the back surface of the windshield 56. In this manner, the windshield is tightly sealed and also spaced from wall 52. As a final assembly operation, a trim strip 60 is secured by fastener 62 onto frame 50. This trim strip is coextensive with the edge of the windshield and provides a molding for the same.

The present invention is directed toward a method of producing the pressure sensitive sealing strip A as explained above. The primary feature of the present invention is the initial provision of support ribbon 70 best shown in FIGURE 4, which ribbon includes the dam 20 supported in a particular position on paper 10 by transfer adhesive layer 32. As previously explained, adhesive layer 32 is first deposited on one edge of the paper 10, and the extruded or molded dam is then deposited onto the adhesive layer. When the dam is removed from the paper, the adhesive layer is transferred from the paper to the dam for use as shown in FIGURE 2. In accordance with the invention, the release paper 10 of the support ribbon 70 has a width B, and the apex 30 between the sealing lip 26 and the anchor lip 28 is spaced from the far edge of the paper 10 a distance represented as A. In accordance with the invention, the support ribbon is constructed so that the distance A is 75%–100% of the width B. In other words, the apex 30 of the dam 20 is spaced from the far edge of the paper a distance which is at least 75% of the total width of the paper 10. In practice, distance A is between 80%–85% of width B. Distance A could be less precisely defined in relation to the width C of mass 40. In this regard distance A would generally equal width C and a distance D, with distance D being approximately ⅛ inch when width C is approximately ½ inch. It is appreciated that the anchor lip 28 could possibly be eliminated so that the lip 26 would form the actual abutment for locating the mass 40 on the paper. Irrespective of the pressure of lip 28, the transverse position of the mass 40 on the paper is generally determined by lip 26. By providing this lip 26 on one side of the paper and spaced from the opposite edge by a distance at least 75% of the width of the paper strip 10, the mass 40 is automatically deposited in the center of the paper. Consequently, by first providing a composite support ribbon 70, including both the release paper used in the finished sealing strip and the dam, the dam locates and guides the mass 40 onto the paper in a manner that assures that the mass is in the center of the paper strip. This is a substantial advance over previous methods of forming strip A. In those methods, an adhesive was applied to the bottom of the dam and both the dam and tacky mass were jointly deposited onto the release paper. This required complicated mechanisms and resulted in a slower processing operation. By using a support ribbon having the dam on one side of the release paper to be used as part of the final strip, relatively simple mechanisms may be used to deposit the mass 40 in the final position on the ribbon and, thus, on the finished strip.

Referring now to FIGURE 3, there is schematically illustrated a mechanism for depositing the tacky, pressure sensitive pliable mass onto the support ribbon 70. A masticator 80, including a hopper 82 and an outlet 84, receives bulk adhesive material 86 and exudes masticated adhesive material 88. This masticated material is fed into an extruder 90 having a hopper 92 and an outlet 94. Of course, the outlet 94 includes an orifice having a shape generally matching the shape of the mass 40 as shown in FIGURE 5. Support ribbon 70 with the lip 26 of dam 20 extending upwardly from paper 10 is moved longitudinally by a conveyor 100 so that the mass 40 emanating from outlet 94 is deposited on the transverse center of the paper 10 and against the dam 20. The dam forms a guide for the extruded mass to accurately align the mass on the paper. Support ribbon 70 is uncoiled from a supply reel 102 and passes around tension arms 104, 106 before reaching the conveyor 100. After the mass 40 has been deposited onto the ribbon, the composite sealing strip A is moved by the conveyor to a slack loop 108. From this loop, the material is coiled onto a support spindle 110 rotated by a coiling station 112. Although the spindle 110 is shown, for illustrative purposes, as rotating about a horizontal axis, in practice the station 112 rotates the spindle around a generally vertical axis. After the proper amount of sealing strip A is coiled onto the spindle 110, the sealing strip is cut, and a new spindle 110 is positioned on the station 112 for receipt of the strip moving from loop 108.

Referring now to FIGURES 3A, 3B, another aspect of the present invention is disclosed. A ball or pressure element 120 is rotatably supported on a bifurcated arm 122 which is affixed to a reciprocal rod 124. The rod reciprocates within a support 126, and a spring 128 forces the ball 120 outwardly against resilient dam 20. The amount of outward movement of the ball is limited by an appropriately positioned nut 130 affixed to the rearwardmost end of rod 124. Spring 128 has a modulus of elasticity which causes the ball 120 to apply a slight amount of inward pressure against lip 26 of dam 20. In this manner, the bond between the lip 26 and the adhesive mass 40 is established immediately after the mass is extruded onto the support ribbon 70. This particular aspect of the invention assures a firm bond between the mass 40 and the dam. This bond combines with the bond between the mass and the paper 10 to hold the mass 40 in position on the paper.

The present invention has been described in connection with certain structural embodiments; however, it should be appreciated that this embodiment may be varied without departing from the intended spirit and scope of the present invention.

Having thus described my invention, I claim:

1. A method of producing a support ribbon for a pressure sensitive, adhesive cushion seal, said method comprising the following steps:
    (a) providing a length of release paper having a width B, an upper surface and a lower surface, said surfaces being adapted to adhere releasably with a pressure sensitive adhesive;
    (b) forming an elongated, resilient dam having a bottom, generally flat surface, an upstanding sealing lip, and a transversely extending anchor lip;
    (c) applying a transfer pressure sensitive adhesive layer on said upper surface of said paper and at one side thereof;
    (d) bringing said bottom surface of said dam against said transfer adhesive so that said dam is secured longitudinally of said paper and at one side with said sealing lip and said anchor lip forming a retaining abutment for subsequent extrusion of a pressure sensitive, pliable cushion seal generally centrally along said upper surface of said paper.

2. A method as defined in claim 1 including the additional step of:
    (a) extruding a pressure sensitive, pliable cushion seal generally centrally along said upper surface of said paper and against said abutment.

3. A method as defined in claim 2 including the additional step of:
    (a) pressing said seal against said abutment immediately subsequent to extrusion into said paper.

4. A method as defined in claim 1 wherein said lips of said dam intersect at a longitudinally extending apex, said apex being spaced from the edge of said paper opposite said adhesive a distance A, said distance A being substantially greater than 75% of width B.

5. A method as defined in claim 4 wherein said distance A is in the range of 75%–100% of width B.

6. A method of producing a pressure sensitive, adhesive sealing strip, said method comprising the steps of:
    (a) providing a length of release paper having a width B, an upper surface and a lower surface, said surfaces being adapted to adhere with a pressure sensitive adhesive;
    (b) forming an elongated, resilient dam having a bottom, generally flat surface and an upstanding sealing lip;
    (c) adhering said dam onto one side of said upper surface of said paper with said lip forming a retaining abutment;
    (d) extruding a pressure sensitive, pliable cushion seal generally centrally along said upper surface of said paper and against said abutment; and,
    (e) pressing said seal against said abutment immediately subsequent to extrusion onto said paper.

7. A method of producing a support ribbon for a pressure sensitive, adhesive cushion seal, said method comprising the following steps:
    (a) providing a length of release paper having a width B, an upper surface and a lower surface, said surfaces being adapted to adhere releasably with a pressure sensitive adhesive;
    (b) forming an elongated, resilient dam having a bottom, generally flat surface, an upstanding sealing lip, and a transversely extending anchor lip;
    (c) applying a pressure sensitive adhesive layer on said bottom surface; and
    (d) bringing said bottom surface of said dam against said release paper at one side thereof so that said dam is secured longitudinally of said paper and at one side with said sealing lip and said anchor lip forming a retaining abutment for subsequent extension of a pressure sensitive, pliable cushion seal generally centrally along said upper surface of said paper.

8. A method of producing a pressure sensitive, adhesive sealing strip, said method comprising the steps of:
    (a) providing, as a unit, a support ribbon including a strip of release paper, an elongated resilient spacing dam extending along said edge of said paper, and an adhesive layer releasably holding said dam onto said paper, said layer being removable with said dam as said dam is separated from said paper; and
    (b) depositing a mass of pressure sensitive, pliable cushion sealing material onto said paper along its length with said mass abutting said dam and centrally located on said paper.

References Cited

UNITED STATES PATENTS

| | | | |
|---|---|---|---|
| 3,037,810 | 6/1962 | Kelley | 52—208 |
| 3,155,204 | 11/1964 | Campbell et al. | 296—93 X |
| 3,231,441 | 1/1966 | Mitchell | 156—249 X |
| 3,241,277 | 3/1966 | Coppock | 52—208 |

EARL M. BERGERT, *Primary Examiner.*

T. R. SAVOIE, *Assistant Examiner.*

U.S. Cl. X.R.

52—208; 296—93; 161—167; 156—108, 249